Aug. 9, 1932.    W. B. CONLON ET AL    1,870,605
BRAKE DRUM SPACER
Filed Feb. 12, 1931    2 Sheets-Sheet 2

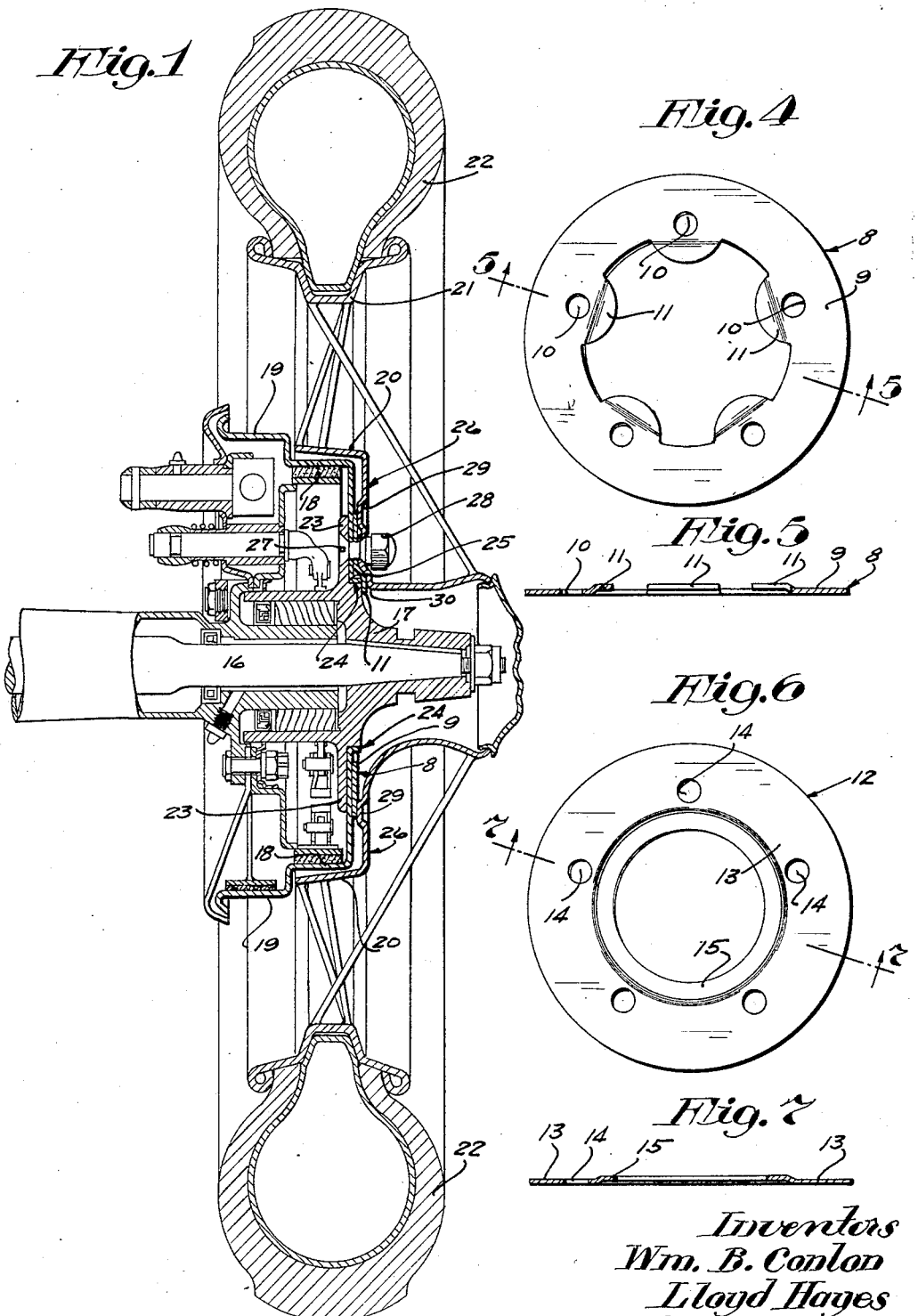

Inventor
Wm. B. Conlon
Lloyd Hayes
By his Attorneys

Patented Aug. 9, 1932

1,870,605

UNITED STATES PATENT OFFICE

WILLIAM B. CONLON, OF MINNEAPOLIS, AND LLOYD HAYES, OF ROBBINSDALE, MINNESOTA

BRAKE DRUM SPACER

Application filed February 12, 1931. Serial No. 515,180.

This invention has for its object to provide an extremely simple and highly efficient spacer for holding the hub shells of demountable wheels for automotive vehicles out of contact with the brake drums.

It is essential for smooth and even brake operation that the brake drums of automotive vehicles be round or concentric within limits of say 5 to 8 one thousandths of an inch.

It has been found through experience that the brake drums on Model A Ford automobiles, both passenger cars and light trucks, are usually much more out of round than that and this condition is caused or aggravated by the outer edge of the hub shell, which forms a rigid part of the demountable wheel, pressing against the back of the brake drum near the periphery thereof. This pressing action of the hub shell is usually caused by the tightening of the nuts on the studs which detachably secure said shell to the hub proper. When turning corners a lateral strain is often placed on a wheel that is sufficient to cause its hub shell to press against the back of the brake drum and this undue pressure tends to distort the drum and throw the same out of round. Attempts have been made to correct the out-of-roundness of this type of brake drum by truing the same up in a lathe but the drum is again thrown out-of-roundness in tightening its nuts on the studs when replacing the demountable wheel on its hub.

Our invention provides a properly shaped and dimensioned spacer to be placed between the back of the brake drum and the hub shell, of a Model A Ford, to axially space said hub shell from the brake drum to hold its outer edge out of contact with the back of the brake drum. This spacing of a hub shell from the brake drum prevents said shell from being pressed against the back of the brake drum when the nuts are tightened on the studs to secure the demountable wheel to its hub and also when the vehicle is turning a corner as above stated.

It has also been found that by relieving the pressure of the hub shell on the brake drum said drum will assume or nearly assume its correct cylindrical form. After this pressure on the brake drum has been relieved it has been found that by a heavy application of the brakes that the high spots in the brake drum, caused by pressure thereon, will be removed due to the fact that the brake shoes are relatively rigid and will not spring as much as the brake drum.

To the above end, generally stated, the invention consists of the novel construction and arrangement of parts hereinafter described and defined in the claims.

In the accompanying drawings, which illustrate the invention, like characters indicate like parts throughout the several views.

Referring to the drawings:

Fig. 1 is a view principally in section showing one of the rear wheel and axle assemblies of a Ford automobile in which the invention is embodied;

Fig. 4 is a face view showing one form of the spacer;

Fig. 5 is a view in section taken on the line 5—5 of Fig. 4;

Fig. 6 is a view corresponding to Fig. 4, but showing another form of the improved spacer; and Fig. 7 is a view in section taken on the line 7—7 of Fig. 6.

Figure 3:
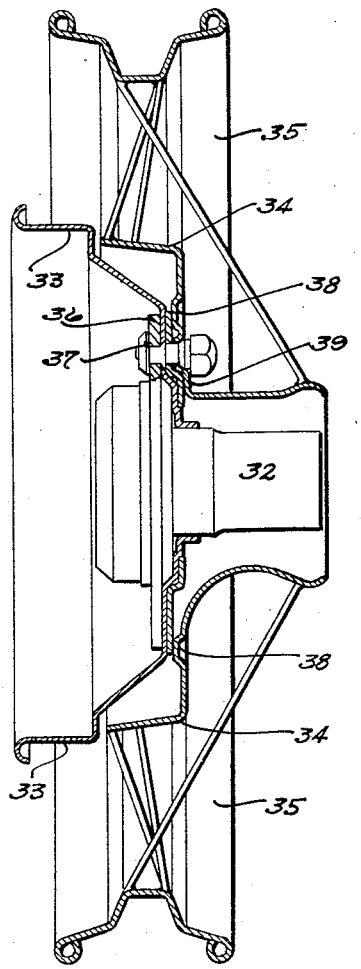
Fig. 3 is a view principally in section showing one of the front wheel assemblies of a Ford automobile in which the invention is embodied.
Figure 2:
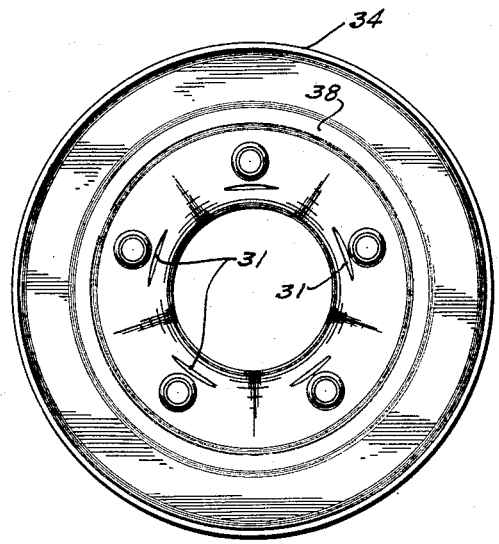
Fig. 2 is a rear elevation of the hub shell removed from the wheel and hub.

The spacer 8 shown in Figs. 4 and 5 is a flat ring 9 having a plurality of circumferentially spaced bolt or stud holes 10, as shown five, and a like number of segmental lugs 11 integral with the inner annular edge of the ring 9 and projecting into the axial hole therein. These lugs 11 are axially outwardly offset from the outer face of the ring 9 for a purpose that will presently appear.

Referring now to the spacer 12 shown in Figs. 6 and 7, the same is identical with the spacer 8 as to its ring 13 and holes 14 but in place of the lugs 11 it is provided with a continuous flange 15 that is axially outwardly offset from the ring 13 and serves the same purpose as said lugs.

Of the parts of the rear wheel assembly of a Model A Ford automobile illustrated in Fig. 1, it is important to note the rear axle 16, hub 17, inner and outer brake drums 18 and 19, respectively, and hub shell 20 of the demountable wire wheel 21 on the rim of which is mounted a pneumatic tire 22. Integral with the hub 17 is a circumferentially extended flange 23 axially inset from the face of said hub to form an annular shoulder 24. Both brake drums 18 and 19 are formed from a single piece of metal connected by the back of the outer drum 19. Formed in the back of the inner drum 18 is an eye through which the hub 17 projects and surrounded by a flange 25 seated on the shoulder 24 with the back of said drum bearing against the outer face of the flange 23.

The brake drums 18—19 and the hub shell 20 are rigidly but detachably secured to the flange 23 by a plurality of, as shown five, circumferentially spaced studs 27 in the form of bolts which project from the inner face of the flange 23 through aligned holes in said flange, back of the inner brake drum 18 and back of the hub shell 20 and having nuts 28 applied to their outer ends. These nuts 28 impinge against the outer face of the back of the hub shell 20 and rigidly clamp the back of the inner drum 18 against the outer face of the flange 23 and the back 26 of the hub shell 20 against said back of the inner drum 18. Pressed from the back 26 of the hub shell 20, outward of the studs 27, is an inwardly projecting annular flat bead 29.

Primarily the bead 29 directly engages the outer face of the back of the inner drum 18 with the inner edge of said drum 18 pressing against the back of the outer drum 19 near the periphery thereof. The hub shell 20 radially inward from the studs 27 is axially outwardly offset at 30 to afford clearance for the flange 25 and is provided on its inner face with five circumferentially spaced contact points 31 which primarily directly engage the outer edge of the flange 25 and seat the hub shell 20 thereon.

It is the pressure above referred to on the back of the outer brake drum 19 by the hub shell 20, when the nuts 28 are tightened on the studs 27 to secure the demountable wheel 21 on the hub 17, that distorts or throws the brake drums 18 and 19 out-of-round.

To space the hub shell 20 from the back of the inner drum 18 and hold its outer edge spaced from the back of the outer drum 19 one of the spacers 8, as shown in Fig. 1, is interposed between the backs of the inner drum 18 and hub shell 20.

To apply the spacer 8 to the wheel assembly above described, the nuts 28 are removed to release the hub shell 20 and permit the removal of the wheel 21 and all parts carried thereby. The spacer 8 is then telescoped over the outer end of the hub 17 and its ring 9 placed against the back of the inner drum 18 with the studs 27 projecting through the holes 10 and with the outwardly offset lugs 11 overlapping and engaging the outer edge of the flange 25 and the adjacent face of the hub 17. The wheel 21 is next replaced with the studs 27 extending through the holes in the back of the hub shell 20 and with the bead 29 engaging the ring 9 of the spacer 8 and the points of contact 31 on the hub shell 20 engaging the shoulders of the lugs 11. Finally the nuts 28 are applied to the studs 27 and tightened to rigidly secure the wheel 21 to the hub 17 with the back of the inner drum 18 and the ring 9 of the spacer 8 frictionally clamped between said hub shell and the flange 23 and with the lugs 11 pressed by the points of contact 31 against the outer edge of the flange 25 and the adjacent outer face of the hub 17. The points of contact 31 by their engagement with the lugs 11 which, in turn, engage the outer edge of the flange 25 press the back of the inner drum 18 against the flange 23.

The thickness of the ring 9 and lugs 11 is such as to hold the inner edge of the hub ring 20 spaced from the back of the outer drum 19 so that it can not be pressed thereagainst by the tightening of the nuts 28 on the studs 27 or during lateral strains placed on the wheel 21 when turning a corner.

The action of the spacer 12 is identical with that of the spacer 8 and its flange 15 serves the same purpose as the lugs 11.

Referring now to Fig. 3 which shows one of the spacers embodied in one of the front wheel assemblies of a Model A Ford automobile:

Of the parts of the front wheel assembly shown, it is important to note the hub 32, brake drum 33 and hub shell 34 of the wire wheel 35. Formed with the hub 32 is a flange 36 having the same number and similarly arranged nut-equipped studs 37 as the flange 23. The hub shell 34 is also identical with the hub shell 20 and its bead and points of contact are indicated by the numerals 38 and 39, respectively. It will thus be seen that the spacers 8 and 12 are interchangeably useable on either the front or rear wheel assembly of a Model A Ford.

The above described spacers 8 and 12 while extremely simple, of small cost to manufacture and easy to apply to a wheel assembly have in actual practice proven highly efficient for the purpose had in view.

What we claim is:

1. The combination with a wheel hub having a circumferentially extended flange axially inset from the outer end of the hub, a brake drum the back of which is seated against the outer face of the flange and has an axial aperture for the hub, the back of the drum at its aperture being axially outwardly offset on the hub, and a hub shell, studs detachably securing the drum and hub shell to the hub flange, the hub shell outward of the studs primarily engaging the back of the drum with its outer edge adjacent to the back of the drum, said hub shell radially inward from the studs having points of contact that primarily engage the axially offset portion of the back of the drum, of a spacer interposed between the back of the drum and the back of the hub shell radially outward of the studs and having an axially offset inner portion interposed between said points of contact on the hub shell and the back of the drum and overlapping the face of the hub.

2. The combination with a wheel hub having concentric axially spaced outer and inner brake drums connected the one with the other by the back of the outer drum, studs detachably securing the back of the inner drum to said hub, and a hub shell detachably secured by the studs to the hub and primarily clamped thereon with its inner edge adjacent to the back of the outer drum, of a spacer interposed between the back of the inner drum and the hub shell radially outward of the studs and having an axially offset portion radially inward from the studs interposed between the back of the inner drum and the hub shell, said spacer having apertures for the studs and holding the hub shell with its outer edge spaced from the back of the outer drum.

3. The combination with a wheel hub having a circumferentially extended flange axially spaced from the outer face of the hub, concentric axially spaced outer and inner brake drums connected the one with the other by the back of the outer drum, studs detachably securing the back of the inner drum to the hub flange, the back of the inner drum radially inward from the studs being axially offset on the hub, and a hub shell detachably secured by the studs to the hub and primarily clamped thereby against the back of the inner drum radially outward from the studs and having an axially offset portion that is primarily clamped against the corresponding portion of said back with the outer edge of the hub shell adjacent to the back of the outer drum, of a spacer interposed between the backs of the inner drum and the hub shell radially outward of the studs, having apertures for said studs and provided with an axially offset portion that is interposed between the corresponding portions of the backs of the inner drum and the hub shell, said spacer holding the hub shell with its outer edge spaced from the back of the outer drum.

4. The combination with a wheel hub, a brake drum, studs detachably securing the back of the drum to the hub, and a hub shell detachably secured by the studs to the hub and having an annular bead radially outward of the studs primarily engaging the back of the drum, said hub shell having radially inward of the studs circumferentially spaced points of contact primarily engaging the axially offset portion of the back of the drum, of a spacer ring interposed between the back of the drum and the bead on the hub shell, having apertures for the studs and circumferentially spaced axially offset lugs interposed between the axially offset portion of the back of the drum and the points of contact on the hub shell, said spacer ring and its lugs holding the hub shell with its outer edge spaced from the back of the drum.

5. The combination with a wheel hub having a circumferentially extended flange axially inset from the outer end of the hub, a brake drum the back of which is seated against the outer face of the flange and has an axial aperture for the hub, the back of the drum at its aperture being axially outwardly offset on the hub, and a hub shell, studs detachably securing the drum and hub shell to the hub flange, the hub shell outward of the studs primarily engaging the back of the drum with its outer edge adjacent to the back of the drum, said hub shell radially inward from the studs having points of contact that primarily engage the axially offset portion of the back of the drum, of a spacer interposed between the back of the drum and the back of the hub shell radially outward of the studs and having an axially offset inner portion interposed between said points of contact on the hub shell and the back of the drum.

6. The combination with a wheel hub having a circumferentially extended flange axially inset from the outer end of the hub, a brake drum the back of which is seated against the outer face of the flange and has an axial aperture for the hub, the back of the drum at its aperture being axially outwardly offset on the hub, and a hub shell, studs detachably securing the drum and hub shell to the hub flange, the hub shell outward of the studs primarily engaging the back of the drum with its outer edge adjacent to the back of the drum, said hub shell radially inward from the studs having points of contact that primarily engage the axially offset portion of the back of the drum, of spacing means interposed between the back of the drum and the back of the hub shell radially outward of the studs and between said points of contact on the hub shell and the back of the drum.

In testimony whereof we affix our signatures.

WILLIAM B. CONLON.
LLOYD HAYES.